United States Patent
Pfister et al.

(10) Patent No.: US 6,950,945 B2
(45) Date of Patent: Sep. 27, 2005

(54) APPARATUS AND METHOD FOR INTERSYSTEM LOCK OPTIMIZATION

(75) Inventors: Gregory Francis Pfister, Austin, TX (US); Renato John Recio, Austin, TX (US); Noshir Cavas Wadia, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 892 days.

(21) Appl. No.: 09/886,187

(22) Filed: Jun. 21, 2001

(65) Prior Publication Data

US 2002/0199113 A1 Dec. 26, 2002

(51) Int. Cl.[7] .................. G06F 11/30; G06F 12/14; H04L 9/00; H04L 9/32
(52) U.S. Cl. ..................... 713/200; 718/104
(58) Field of Search ............ 713/200; 718/104; 710/200

(56) References Cited

U.S. PATENT DOCUMENTS 5,392,433 A * 2/1995 Hammersley et al. ...... 710/200

OTHER PUBLICATIONS

IBM Technical Disclosure Bulletin, "Fine Granularity Locking to Support High Data Availability in a Client/Server Database Management System", Feb. 1995, pp. 143–146.*

* cited by examiner

Primary Examiner—Gilberto Barron
Assistant Examiner—G. Gurshman
(74) Attorney, Agent, or Firm—Duke W. Yee; Mark E. McBurney; Betty Formby

(57) ABSTRACT

An apparatus and method for distributed intersystem lock optimization are provided. With the apparatus and method of the present invention, the time required to obtain an uncontested lock, meaning a lock that no other program or process in the distributed system is simultaneously attempting to acquire, is minimized. The apparatus and method of the present invention increases the speed with which locks are acquired by splitting the process of obtaining a lock into two separate operations: a test for contention, and then if contention exists, a full lock operation. The test for contention is made fast by associating each lock with a memory location, and using an atomic operation or the like, to atomically set the memory location associated with the lock to a different value. If the lock is found to be contested, meaning that another program or process has already locked it, control is turned over to a slower operation than ensures that the lock-requesting program or process will eventually be granted the lock.

33 Claims, 10 Drawing Sheets

APPARATUS AND METHOD FOR INTERSYSTEM LOCK OPTIMIZATION

BACKGROUND OF THE INVENTION

1. Technical Field

The present invention is directed to an improved data processing system. More specifically, the present invention is directed to an apparatus and method for intersystem lock optimization.

2. Description of Related Art

In a System Area Network (SAN), the hardware provides a message passing mechanism that can be used for Input/Output devices (I/O) and interprocess communications (IPC) between general computing nodes. Processes executing on devices access SAN message passing hardware by posting send/receive messages to send/receive work queues on a SAN channel adapter (CA). These processes also are referred to as "consumers."

The send/receive work queues (WQ) are assigned to a consumer as a queue pair (QP). The messages can be sent over five different transport types: Reliable Connected (RC), Reliable datagram (RD), Unreliable Connected (UC), Unreliable Datagram (UD), and Raw Datagram (RawD). Consumers retrieve the results of these messages from a completion queue (CQ) through SAN send and receive work completion (WC) queues. The source channel adapter takes care of segmenting outbound messages and sending them to the destination. The destination channel adapter takes care of reassembling inbound messages and placing them in the memory space designated by the destination's consumer.

Two channel adapter types are present in nodes of the SAN fabric, a host channel adapter (HCA) and a target channel adapter (TCA). The host channel adapter is used by general purpose computing nodes to access the SAN fabric. Consumers use SAN verbs to access host channel adapter functions. The software that interprets verbs and directly accesses the channel adapter is known as the channel interface (CI).

Target channel adapters (TCA) are used by nodes that are the subject of messages sent from host channel adapters. The target channel adapters serve a similar function as that of the host channel adapters in providing the target node an access point to the SAN fabric.

The SAN channel adapter architecture explicitly provides for sending and receiving messages directly from application programs running under an operating system. No intervention by the operating system is required for an application program to post messages on send queues, post message receive buffers on receive queues, and detect completion of send or receive operations by polling of completion queues or detecting the event of an entry stored on a completion queue, e.g., via an interrupt.

The SAN channel adapter architecture further provides for special messages known as atomic operations to be sent between endnodes. These special messages operate on the memory of the destination node to alter the content of the memory in a non-interruptable manner. These atomic operations include fetch-and-add, which atomically, i.e. non-interruptably, adds a number contained in the atomic operation message to the memory location and returns the prior content of the memory location.

These atomic operations further include a compare-and-swap operation which atomically compares the content of a memory location with a value contained in the atomic operation message. If the two values match, the content of the memory location is replaced with another value contained in the atomic operation message.

These operations being atomic means that no other operation can intervene between their internal steps. Specifically, with fetch-and-add, a memory location must be retrieved, a value added to its content, and the result stored away. No other operation on that memory location can occur between the time the memory location is first retrieved and finally stored. Similarly, no other operation can occur on the memory location operated on by compare-and-swap between the time it initially copies the location's value from memory and possibly (depending on the outcome of the comparison) stores another value in that memory location.

In the SAN architecture, the requirement that no other operation can intervene may be relaxed to reduce the cost of implementation. Instead, no other operations of several different classes may be allowed. Three cases are strong possibilities. First, no other operation done by the channel adapter performing the atomic operation can intervene, but other channel adapters or other host operations can intervene. Second, no other operation performed by any channel adapter can intervene, but other host operations can. Third, nothing on the system, whether the same channel adapter, another channel adapter, or a host, can intervene.

SUMMARY OF THE INVENTION

The present invention provides an apparatus and method for distributed intersystem lock optimization. With the apparatus and method of the present invention, the time required to obtain an uncontested lock, meaning a lock that no other program or process in the distributed system is simultaneously attempting to acquire, is minimized. The apparatus and method of the present invention increases the speed with which locks are acquired by splitting the process of obtaining a lock into two separate operations: a test for contention, and then if contention exists, a full lock operation.

The test for contention is made fast by associating each lock with a memory location, and using an atomic operation or the like, to atomically set the memory location associated with the lock to a different value. If the lock is found to be contested, meaning that another program or process has already locked it, control is turned over to a slower operation than ensures that the lock-requesting program or process will eventually be granted the lock.

Applications in which locks are often contested run slowly because the operations they protect are very serialized, meaning they run on one process or program only. Therefore, great effort is expended on eliminating locks that are heavily contested resulting in most lock operations being uncontested. Since, in practice, most locks are uncontested, increasing the speed at which uncontested locks are acquired will increase the speed of the overall system.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The present invention provides an apparatus and method for increasing the speed at which uncontested locks are acquired by application programs and processes. The present invention may be implemented in hardware, software, or a combination of hardware and software. The present invention is preferably implemented in a distributed computing system, such as a system area network (SAN) having end nodes, switches, routers, and links interconnecting these components. Each end node uses send and receive queue pairs to transmit and receives messages. The end nodes segment the message into packets and transmit the packets over the links. The switches and routers interconnect the end nodes and route the packets to the appropriate end node. The end nodes reassemble the packets into a message at the destination.

Figure 1:
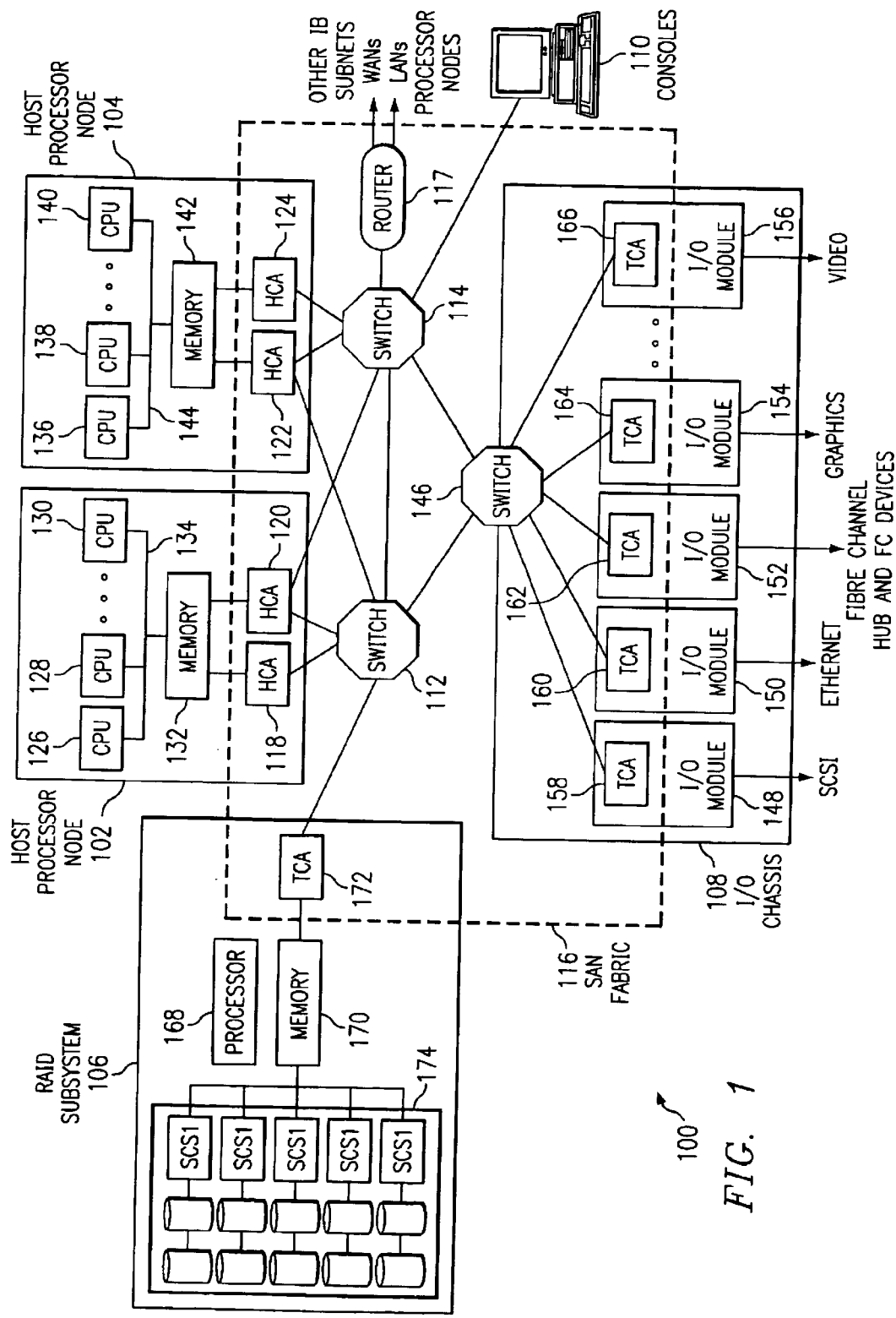
FIG. 1 is a diagram of a distributed computer system is illustrated in accordance with a preferred embodiment of the present invention.

FIG. 1 is a diagram of a distributed computer system in accordance with a preferred embodiment of the present invention. The distributed computer system represented in FIG. 1 takes the form of a system area network (SAN) 100 and is provided merely for illustrative purposes, and the embodiments of the present invention described below can be implemented on computer systems of numerous other types and configurations. For example, computer systems implementing the present invention can range from a small server with one processor and a few input/output (I/O) adapters to massively parallel supercomputer systems with hundreds or thousands of processors and thousands of I/O adapters. Furthermore, the present invention can be implemented in an infrastructure of remote computer systems connected by an Internet or intranet.

SAN 100 is a high-bandwidth, low-latency network interconnecting nodes within the distributed computer system. A node is any component attached to one or more links of a network and forming the origin and/or destination of messages within the network. In the depicted example, SAN 100 includes nodes in the form of host processor node 102, host processor node 104, redundant array independent disk (RAID) subsystem node 106, and I/O chassis node 108. The nodes illustrated in FIG. 1 are for illustrative purposes only, as SAN 100 can connect any number and any type of independent processor nodes, I/O adapter nodes, and I/O device nodes. Any one of the nodes can function as an endnode, which is herein defined to be a device that originates or finally consumes messages or frames in SAN 100.

In one embodiment of the present invention, an error handling mechanism in distributed computer systems is present in which the error handling mechanism allows for reliable connection or reliable datagram communication between end nodes in distributed computing system, such as SAN 100.

A message, as used herein, is an application-defined unit of data exchange, which is a primitive unit of communication between cooperating processes. A packet is one unit of data encapsulated by networking protocol headers and/or trailers. The headers generally provide control and routing information for directing the frame through SAN. The trailer generally contains control and cyclic redundancy check (CRC) data for ensuring packets are not delivered with corrupted contents.

SAN 100 contains the communications and management infrastructure supporting both I/O and interprocessor communications (IPC) within a distributed computer system. The SAN 100 shown in FIG. 1 includes a switched communications fabric 116, which allows many devices to concurrently transfer data with high-bandwidth and low latency in a secure, remotely managed environment. Endnodes can communicate over multiple ports and utilize multiple paths through the SAN fabric. The multiple ports and paths through the SAN shown in FIG. 1 can be employed for fault tolerance and increased bandwidth data transfers.

The SAN 100 in FIG. 1 includes switch 112, switch 114, switch 146, and router 117. A switch is a device that connects multiple links together and allows routing of packets from one link to another link within a subnet using a small header Destination Local Identifier (DLID) field. A router is a device that connects multiple subnets together and is capable of routing frames from one link in a first subnet to another link in a second subnet using a large header Destination Globally Unique Identifier (DGUID).

In one embodiment, a link is a full duplex channel between any two network fabric elements, such as endnodes, switches, or routers. Example suitable links include, but are not limited to, copper cables, optical cables, and printed circuit copper traces on backplanes and printed circuit boards.

For reliable service types, endnodes, such as host processor endnodes and I/O adapter endnodes, generate request packets and return acknowledgment packets. Switches and routers pass packets along, from the source to the destination. Except for the variant CRC trailer field, which is updated at each stage in the network, switches pass the packets along unmodified. Routers update the variant CRC trailer field and modify other fields in the header as the packet is routed.

In SAN 100 as illustrated in FIG. 1, host processor node 102, host processor node 104, and I/O chassis 108 include at least one channel adapter (CA) to interface to SAN 100. In one embodiment, each channel adapter is an endpoint that implements the channel adapter interface in sufficient detail to source or sink packets transmitted on SAN fabric 100. Host processor node 102 contains channel adapters in the form of host channel adapter 118 and host channel adapter 120. Host processor node 104 contains host channel adapter 122 and host channel adapter 124. Host processor node 102 also includes central processing units 126–130 and a memory 132 interconnected by bus system 134. Host processor node 104 similarly includes central processing units 136–140 and a memory 142 interconnected by a bus system 144.

Host channel adapters 118 and 120 provide a connection to switch 112 while host channel adapters 122 and 124 provide a connection to switches 112 and 114.

In one embodiment, a host channel adapter is implemented in hardware. In this implementation, the host channel adapter hardware offloads much of central processing unit and I/O adapter communication overhead. This hardware implementation of the host channel adapter also permits multiple concurrent communications over a switched network without the traditional overhead associated with communicating protocols. In one embodiment, the host channel adapters and SAN 100 in FIG. 1 provide the I/O and interprocessor communications (IPC) consumers of the distributed computer system with zero processor-copy data transfers without involving the operating system kernel process, and employs hardware to provide reliable, fault tolerant communications.

As indicated in FIG. 1, router 116 is coupled to wide area network (WAN) and/or local area network (LAN) connections to other hosts or other routers.

The I/O chassis 108 in FIG. 1 includes an I/O switch 146 and multiple I/O modules 148–156. In these examples, the I/O modules take the form of adapter cards. Example adapter cards illustrated in FIG. 1 include a SCSI adapter card for I/O module 148; an adapter card to fiber channel hub and fiber channel-arbitrated loop (FC-AL) devices for I/O module 152; an ethernet adapter card for I/O module 150; a graphics adapter card for I/O module 154; and a video adapter card for I/O module 156. Any known type of adapter card can be implemented. I/O adapters also include a switch in the I/O adapter backplane to couple the adapter cards to the SAN fabric. These modules contain target channel adapters 158–166.

In this example, RAID subsystem node 106 in FIG. 1 includes a processor 168, a memory 170, a target channel adapter (TCA) 172, and multiple redundant and/or striped storage disk unit 174. Target channel adapter 172 can be a fully functional host channel adapter.

SAN 100 handles data communications for I/O and interprocessor communications. SAN 100 supports high-bandwidth and scalability required for I/O and also supports the extremely low latency and low CPU overhead required for interprocessor communications. User clients can bypass the operating system kernel process and directly access network communication hardware, such as host channel adapters, which enable efficient message passing protocols. SAN 100 is suited to current computing models and is a building block for new forms of I/O and computer cluster communication. Further, SAN 100 in FIG. 1 allows I/O adapter nodes to communicate among themselves or communicate with any or all of the processor nodes in distributed computer system. With an I/O adapter attached to the SAN 100, the resulting I/O adapter node has substantially the same communication capability as any host processor node in SAN 100.

In one embodiment, the SAN 100 shown in FIG. 1 supports channel semantics and memory semantics. Channel semantics is sometimes referred to as send/receive or push communication operations. Channel semantics are the type of communications employed in a traditional I/O channel where a source device pushes data and a destination device determines a final destination of the data. In channel semantics, the packet transmitted from a source process specifies a destination processes' communication port, but does not specify where in the destination processes' memory space the packet will be written. Thus, in channel semantics, the destination process pre-allocates where to place the transmitted data.

In memory semantics, a source process directly reads or writes the virtual address space of a remote node destination process. The remote destination process need only communicate the location of a buffer for data, and does not need to be involved in the transfer of any data. Thus, in memory semantics, a source process sends a data packet containing the destination buffer memory address of the destination process. In memory semantics, the destination process previously grants permission for the source process to access its memory.

Channel semantics and memory semantics are typically both necessary for I/O and interprocessor communications. A typical I/O operation employs a combination of channel and memory semantics. In an illustrative example I/O operation of the distributed computer system shown in FIG. 1, a host processor node, such as host processor node 102, initiates an I/O operation by using channel semantics to send a disk write command to a disk I/O adapter, such as RAID subsystem target channel adapter (TCA) 172. The disk I/O adapter examines the command and uses memory semantics to read the data buffer directly from the memory space of the host processor node. After the data buffer is read, the disk I/O adapter employs channel semantics to push an I/O completion message back to the host processor node.

In one exemplary embodiment, the distributed computer system shown in FIG. 1 performs operations that employ virtual addresses and virtual memory protection mechanisms to ensure correct and proper access to all memory. Applications running in such a distributed computed system are not required to use physical addressing for any operations.

Figure 2:
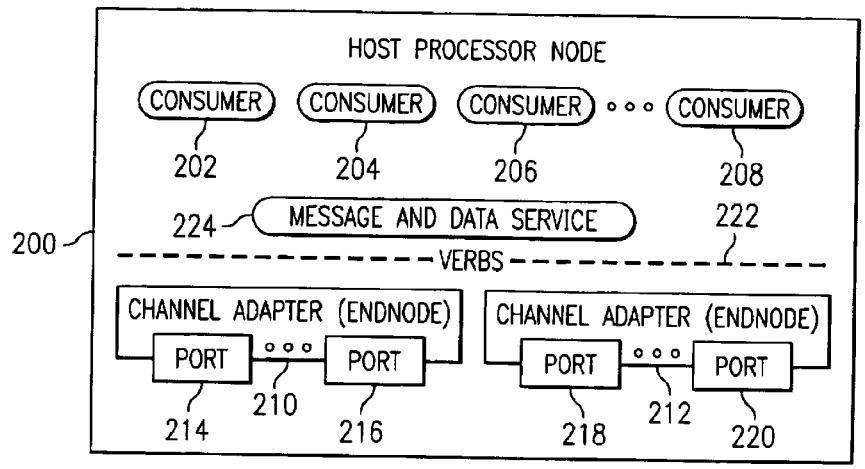
FIG. 2 is a functional block diagram of a host processor node in accordance with a preferred embodiment of the present invention.

Turning next to FIG. 2, a functional block diagram of a host processor node is depicted in accordance with a preferred embodiment of the present invention. Host processor node 200 is an example of a host processor node, such as host processor node 102 in FIG. 1. In this example, host processor node 200 shown in FIG. 2 includes a set of consumers 202–208, which are processes executing on host processor node 200. Host processor node 200 also includes channel adapter 210 and channel adapter 212. Channel adapter 210 contains ports 214 and 216 while channel adapter 212 contains ports 218 and 220. Each port connects to a link. The ports can connect to one SAN subnet or multiple SAN subnets, such as SAN 100 in FIG. 1. In these examples, the channel adapters take the form of host channel adapters.

Consumers 202–208 transfer messages to the SAN via the verbs interface 222 and message and data service 224. A verbs interface is essentially an abstract description of the functionality of a host channel adapter. An operating system may expose some or all of the verb functionality through its programming interface. Basically, this interface defines the behavior of the host. Additionally, host processor node 200 includes a message and data service 224, which is a higher-level interface than the verb layer and is used to process messages and data received through channel adapter 210 and channel adapter 212. Message and data service 224 provides an interface to consumers 202–208 to process messages and other data.

Figure 3A:
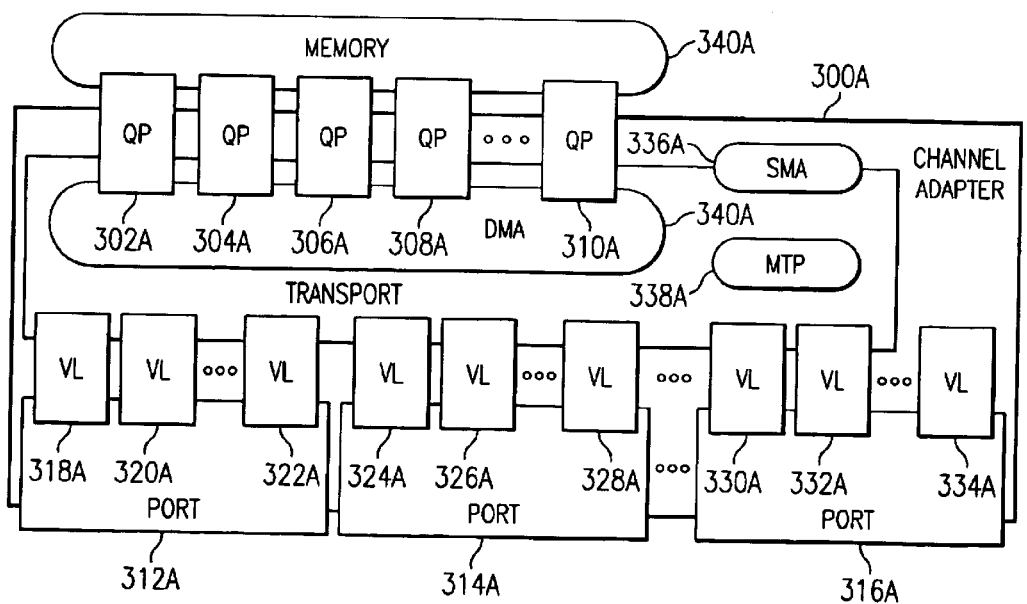
FIG. 3A is a diagram of a host channel adapter in accordance with a preferred embodiment of the present invention.

With reference now to FIG. 3A, a diagram of a host channel adapter is depicted in accordance with a preferred embodiment of the present invention. Host channel adapter 300A shown in FIG. 3A includes a set of queue pairs (QPs) 302A–310A, which are used to transfer messages to the host channel adapter ports 312A–316A. Buffering of data to host channel adapter ports 312A–316A is channeled through virtual lanes (VL) 318A–334A where each VL has its own flow control. Subnet manager configures channel adapters with the local addresses for each physical port, i.e., the port's LID. Subnet manager agent (SMA) 336A is the entity that communicates with the subnet manager for the purpose of configuring the channel adapter. Memory translation and protection (MTP) 338A is a mechanism that translates virtual addresses to physical addresses and validates access rights. Direct memory access (DMA) 340A provides for direct memory access operations using memory 340A with respect to queue pairs 302A–310A.

A single channel adapter, such as the host channel adapter 300A shown in FIG. 3A, can support thousands of queue pairs. By contrast, a target channel adapter in an I/O adapter typically supports a much smaller number of queue pairs. Each queue pair consists of a send work queue (SWQ) and a receive work queue. The send work queue is used to send channel and memory semantic messages. The receive work queue receives channel semantic messages. A consumer calls an operating-system specific programming interface, which is herein referred to as verbs, to place work requests (WRs) onto a work queue.

Figure 3B:
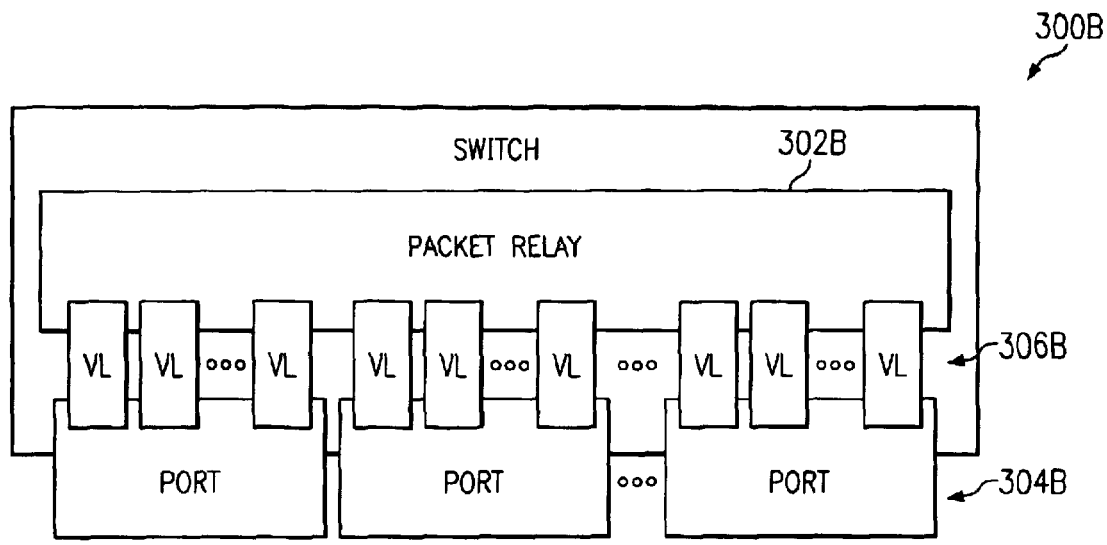
FIG. 3B is a diagram of a switch in accordance with a preferred embodiment of the present invention.

FIG. 3B depicts a switch 300B in accordance with a preferred embodiment of the present invention. Switch 300B includes a packet relay 302B in communication with a number of ports 304B through virtual lanes such as virtual lane 306B. Generally, a switch such as switch 300B can route packets from one port to any other port on the same switch.

Figure 3C:
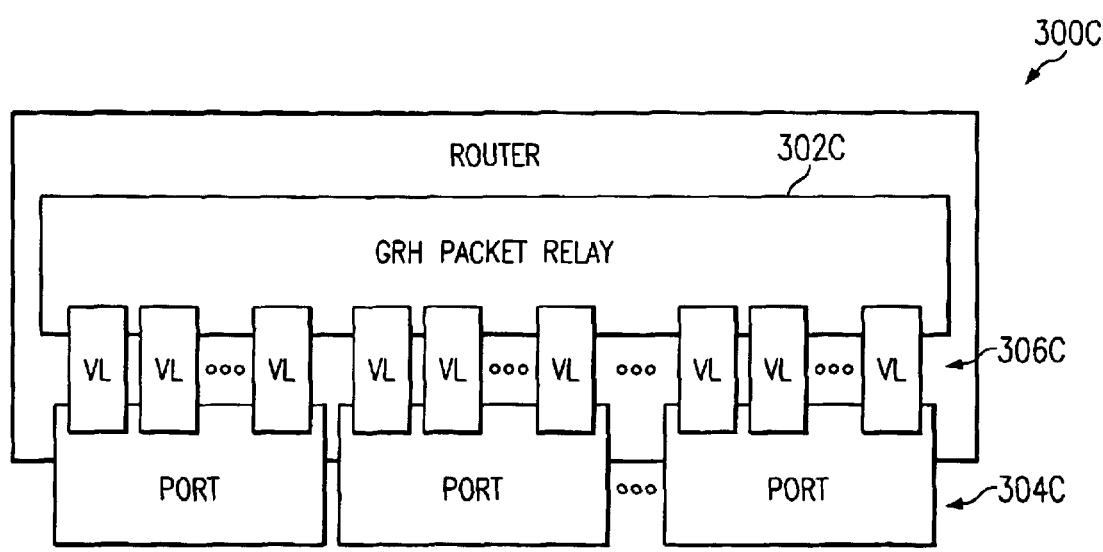
FIG. 3C is a diagram of a router in accordance with a preferred embodiment of the present invention.

Similarly, FIG. 3C depicts a router 300C according to a preferred embodiment of the present invention. Router 300C includes a packet relay 302C in communication with a number of ports 304C through virtual lanes such as virtual lane 306C. Like switch 300B, router 300C will generally be able to route packets from one port to any other port on the same router.

Channel adapters, switches, and routers employ multiple virtual lanes within a single physical link. As illustrated in FIGS. 3A, 3B, and 3C, physical ports connect endnodes, switches, and routers to a subnet. Packets injected into the SAN fabric follow one or more virtual lanes from the packet's source to the packet's destination. The virtual lane that is selected is mapped from a service level associated with the packet. At any one time, only one virtual lane makes progress on a given physical link. Virtual lanes provide a technique for applying link level flow control to one virtual lane without affecting the other virtual lanes. When a packet on one virtual lane blocks due to contention, quality of service (QoS), or other considerations, a packet on a different virtual lane is allowed to make progress.

Virtual lanes are employed for numerous reasons, some of which are as follows: Virtual lanes provide QoS. In one example embodiment, certain virtual lanes are reserved for high priority or isochronous traffic to provide QoS.

Virtual lanes provide deadlock avoidance. Virtual lanes allow topologies that contain loops to send packets across all physical links and still be assured the loops won't cause back pressure dependencies that might result in deadlock.

Virtual lanes alleviate head-of-line blocking. When a switch has no more credits available for packets that utilize a given virtual lane, packets utilizing a different virtual lane that has sufficient credits are allowed to make forward progress.

Figure 4:
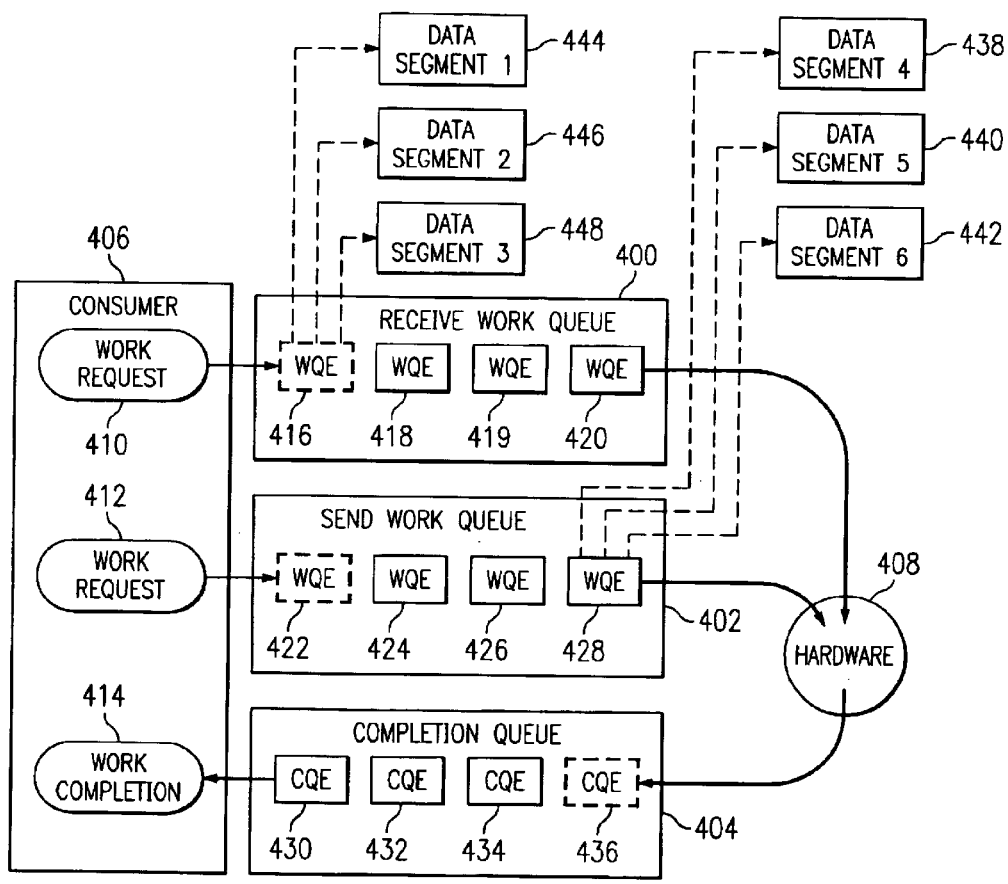
FIG. 4 is a diagram illustrating processing of work requests in accordance with a preferred embodiment of the present invention.

With reference now to FIG. 4, a diagram illustrating processing of work requests is depicted in accordance with a preferred embodiment of the present invention. In FIG. 4, a receive work queue 400, send work queue 402, and completion queue 404 are present for processing requests from and for consumer 406. These requests from consumer 402 are eventually sent to hardware 408. In this example, consumer 406 generates work requests 410 and 412 and receives work completion 414. As shown in FIG. 4, work requests placed onto a work queue are referred to as work queue elements (WQEs).

Send work queue 402 contains work queue elements (WQEs) 422–428, describing data to be transmitted on the SAN fabric. Receive work queue 400 contains work queue elements (WQEs) 416–420, describing where to place incoming channel semantic data from the SAN fabric. A work queue element is processed by hardware 408 in the host channel adapter.

The verbs also provide a mechanism for retrieving completed work from completion queue 404. As shown in FIG. 4, completion queue 404 contains completion queue elements (CQEs) 430–436. Completion queue elements contain information about previously completed work queue elements. Completion queue 404 is used to create a single point of completion notification for multiple queue pairs. A completion queue element is a data structure on a completion queue. This element describes a completed work queue element. The completion queue element contains sufficient information to determine the queue pair and specific work queue element that completed. A completion queue context is a block of information that contains pointers to, length, and other information needed to manage the individual completion queues.

Example work requests supported for the send work queue 402 shown in FIG. 4 are as follows. A send work request is a channel semantic operation to push a set of local data segments to the data segments referenced by a remote node's receive work queue element. For example, work queue element 428 contains references to data segment 4 438, data segment 5 440, and data segment 6 442. Each of the send work request's data segments contains a virtually contiguous memory region. The virtual addresses used to reference the local data segments are in the address context of the process that created the local queue pair.

A remote direct memory access (RDMA) read work request provides a memory semantic operation to read a virtually contiguous memory space on a remote node. A memory space can either be a portion of a memory region or portion of a memory window. A memory region references a previously registered set of virtually contiguous memory addresses defined by a virtual address and length. A memory window references a set of virtually contiguous memory addresses that have been bound to a previously registered region.

The RDMA Read work request reads a virtually contiguous memory space on a remote endnode and writes the data to a virtually contiguous local memory space. Similar to the send work request, virtual addresses used by the RDMA Read work queue element to reference the local data segments are in the address context of the process that created the local queue pair. For example, work queue element 416 in receive work queue 400 references data segment 1 444, data segment 2 446, and data segment 448. The remote virtual addresses are in the address context of the process owning the remote queue pair targeted by the RDMA Read work queue element.

A RDMA Write work queue element provides a memory semantic operation to write a virtually contiguous memory space on a remote node. The RDMA Write work queue element contains a scatter list of local virtually contiguous memory spaces and the virtual address of the remote memory space into which the local memory spaces are written.

A RDMA FetchOp work queue element provides a memory semantic operation to perform an atomic operation on a remote word. The RDMA FetchOp work queue element is a combined RDMA Read, Modify, and RDMA Write operation. The RDMA FetchOp work queue element can support several read-modify-write operations, such as Compare and Swap if equal.

A bind (unbind) remote access key (R_Key) work queue element provides a command to the host channel adapter hardware to modify (destroy) a memory window by associating (disassociating) the memory window to a memory region. The R_Key is part of each RDMA access and is used to validate that the remote process has permitted access to the buffer.

In one embodiment, receive work queue 400 shown in FIG. 4 only supports one type of work queue element, which is referred to as a receive work queue element. The receive work queue element provides a channel semantic operation describing a local memory space into which incoming send messages are written. The receive work queue element includes a scatter list describing several virtually contiguous memory spaces. An incoming send message is written to these memory spaces. The virtual addresses are in the address context of the process that created the local queue pair.

For interprocessor communications, a user-mode software process transfers data through queue pairs directly from where the buffer resides in memory. In one embodiment, the transfer through the queue pairs bypasses the operating system and consumes few host instruction cycles. Queue pairs permit zero processor-copy data transfer with no operating system kernel involvement. The zero processor-copy data transfer provides for efficient support of high-bandwidth and low-latency communication.

When a queue pair is created, the queue pair is set to provide a selected type of transport service. In one embodiment, a distributed computer system implementing the present invention supports four types of transport services: reliable, unreliable, reliable datagram, and unreliable datagram connection service.

Reliable and Unreliable connected services associate a local queue pair with one and only one remote queue pair. Connected services require a process to create a queue pair for each process that is to communicate with over the SAN fabric. Thus, if each of N host processor nodes contain P processes, and all P processes on each node wish to communicate with all the processes on all the other nodes, each host processor node requires $P^2 \times (N-1)$ queue pairs. Moreover, a process can connect a queue pair to another queue pair on the same host channel adapter.

Figure 5:
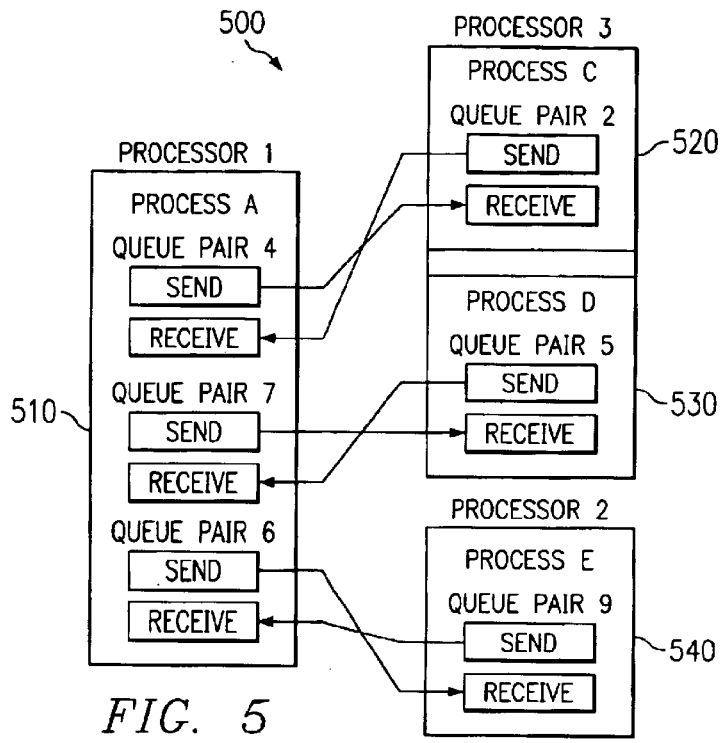
FIG. 5 is a diagram illustrating a portion of a distributed computer system in accordance with a preferred embodiment of the present invention in which a reliable connection service is used.

A portion of a distributed computer system employing a reliable connection service to communicate between distributed processes is illustrated generally in FIG. 5. The distributed computer system 500 in FIG. 5 includes a host processor node 1, a host processor node 2, and a host processor node 3. Host processor node 1 includes a process A 510. Host processor node 2 includes a process C 520 and a process D 530. Host processor node 3 includes a process E 540.

Host processor node 1 includes queue pairs 4, 6 and 7, each having a send work queue and receive work queue. Host processor node 2 has a queue pair 9 and host processor node 3 has queue pairs 2 and 5. The reliable connection service of distributed computer system 500 associates a local queue pair with one an only one remote queue pair. Thus, the queue pair 4 is used to communicate with queue pair 2; queue pair 7 is used to communicate with queue pair 5; and queue pair 6 is used to communicate with queue pair 9.

A WQE placed on one queue pair in a reliable connection service causes data to be written into the receive memory space referenced by a Receive WQE of the connected queue pair. RDMA operations operate on the address space of the connected queue pair.

In one embodiment of the present invention, the reliable connection service is made reliable because hardware maintains sequence numbers and acknowledges all packet transfers. A combination of hardware and SAN driver software retries any failed communications. The process client of the queue pair obtains reliable communications even in the presence of bit errors, receive underruns, and network congestion. If alternative paths exist in the SAN fabric, reliable communications can be maintained even in the presence of failures of fabric switches, links, or channel adapter ports.

In addition, acknowledgments may be employed to deliver data reliably across the SAN fabric. The acknowledgment may, or may not, be a process level acknowledgment, i.e. an acknowledgment that validates that a receiving process has consumed the data. Alternatively, the acknowledgment may be one that only indicates that the data has reached its destination.

Reliable datagram service associates a local end-to-end (EE) context with one and only one remote end-to-end context. The reliable datagram service permits a client process of one queue pair to communicate with any other queue pair on any other remote node. At a receive work queue, the reliable datagram service permits incoming messages from any send work queue on any other remote node.

The reliable datagram service greatly improves scalability because the reliable datagram service is connectionless. Therefore, an endnode with a fixed number of queue pairs can communicate with far more processes and endnodes with a reliable datagram service than with a reliable connection transport service. For example, if each of N host processor nodes contain P processes, and all P processes on each node wish to communicate with all the processes on all the other nodes, the reliable connection service requires $P^2 \times (N-1)$ queue pairs on each node. By comparison, the connectionless reliable datagram service only requires P queue pairs+(N-1) EE contexts on each node for exactly the same communications.

Figure 6:
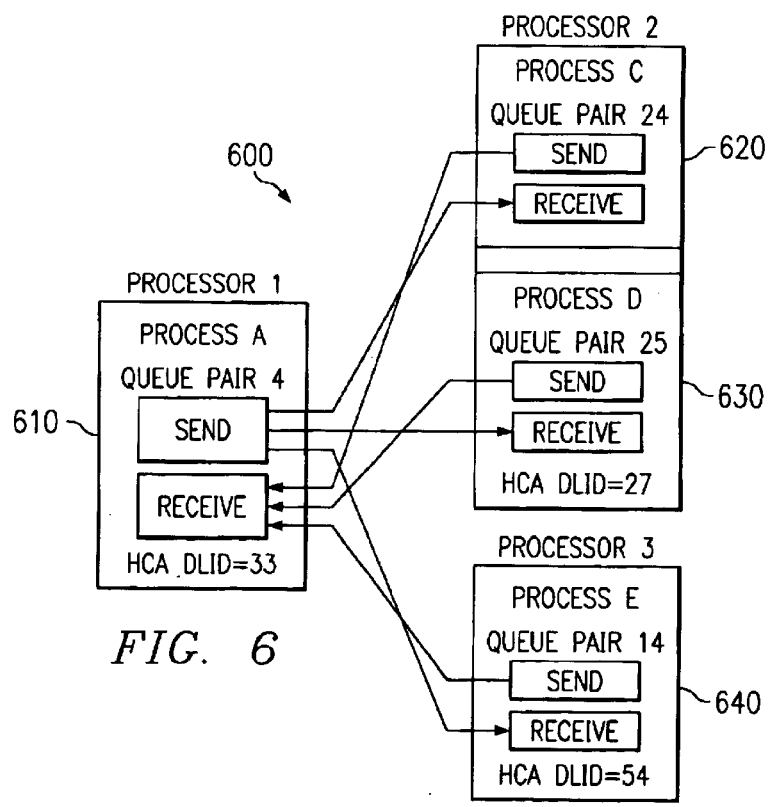
FIG. 6 is a diagram illustrating a portion of a distributed computer system in accordance with a preferred embodiment of the present invention in which reliable datagram service connections are used.

A portion of a distributed computer system employing a reliable datagram service to communicate between distributed processes is illustrated in FIG. 6. The distributed computer system 600 in FIG. 6 includes a host processor node 1, a host processor node 2, and a host processor node 3. Host processor node 1 includes a process A 610 having a queue pair 4. Host processor node 2 has a process C 620 having a queue pair 24 and a process D 630 having a queue pair 25. Host processor node 3 has a process E 640 having a queue pair 14.

In the reliable datagram service implemented in the distributed computer system 600, the queue pairs are coupled in what is referred to as a connectionless transport service. For example, a reliable datagram service couples queue pair 4 to queue pairs 24, 25 and 14. Specifically, a reliable datagram service allows queue pair 4's send work queue to reliably transfer messages to receive work queues in queue pairs 24, 25 and 14. Similarly, the send queues of queue pairs 24, 25, and 14 can reliably transfer messages to the receive work queue in queue pair 4.

In one embodiment of the present invention, the reliable datagram service employs sequence numbers and acknowledgments associated with each message frame to ensure the same degree of reliability as the reliable connection service. End-to-end (EE) contexts maintain end-to-end specific state to keep track of sequence numbers, acknowledgments, and time-out values. The end-to-end state held in the EE contexts is shared by all the connectionless queue pairs communication between a pair of endnodes. Each endnode requires at least one EE context for every endnode it wishes to communicate with in the reliable datagram service (e.g., a given endnode requires at least N EE contexts to be able to have reliable datagram service with N other endnodes).

The unreliable datagram service is connectionless. The unreliable datagram service is employed by management applications to discover and integrate new switches, routers, and endnodes into a given distributed computer system. The unreliable datagram service does not provide the reliability guarantees of the reliable connection service and the reliable datagram service. The unreliable datagram service accordingly operates with less state information maintained at each endnode.

Figure 7:
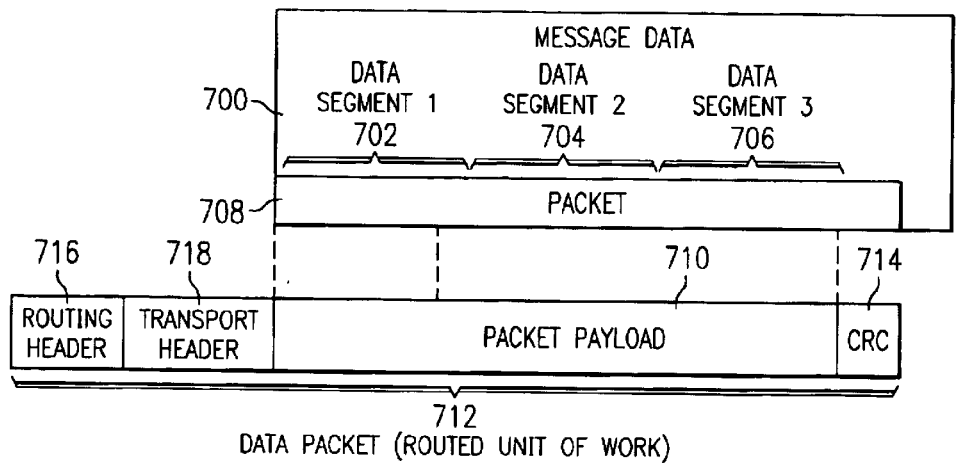
FIG. 7 is an illustration of a data packet in accordance with a preferred embodiment of the present invention.

Turning next to FIG. 7, an illustration of a data packet is depicted in accordance with a preferred embodiment of the present invention. A data packet is a unit of information that is routed through the SAN fabric. The data packet is an endnode-to-endnode construct, and is thus created and consumed by endnodes. For packets destined to a channel adapter (either host or target), the data packets are neither generated nor consumed by the switches and routers in the SAN fabric. Instead for data packets that are destined to a channel adapter, switches and routers simply move request packets or acknowledgment packets closer to the ultimate destination, modifying the variant link header fields in the process. Routers, also modify the packet's network header when the packet crosses a subnet boundary. In traversing a subnet, a single packet stays on a single service level.

Message data 700 contains data segment 1 702, data segment 2 704, and data segment 3 706, which are similar to the data segments illustrated in FIG. 4. In this example, these data segments form a packet 708, which is placed into packet payload 710 within data packet 712. Additionally, data packet 712 contains CRC 714, which is used for error checking. Additionally, routing header 716 and transport 718 are present in data packet 712. Routing header 716 is used to identify source and destination ports for data packet 712. Transport header 718 in this example specifies the destination queue pair for data packet 712. Additionally, transport header 718 also provides information such as the operation code, packet sequence number, and partition for data packet 712.

The operating code identifies whether the packet is the first, last, intermediate, or only packet of a message. The operation code also specifies whether the operation is a send RDMA write, read, or atomic. The packet sequence number is initialized when communication is established and increments each time a queue pair creates a new packet. Ports of an endnode may be configured to be members of one or more possibly overlapping sets called partitions.

Figure 8:
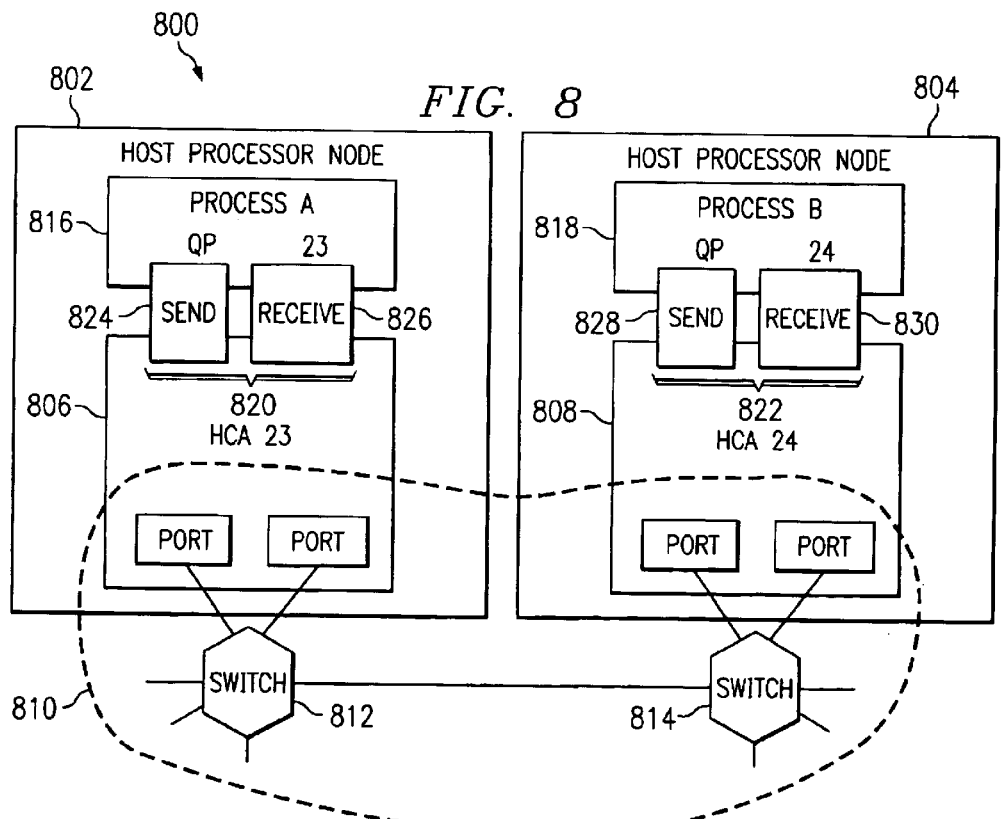
FIG. 8 is a diagram illustrating a portion of a distributed computer system in accordance with a preferred embodiment of the present invention.

In FIG. 8, a portion of a distributed computer system is depicted to illustrate an example request and acknowledgment transaction. The distributed computer system in FIG. 8 includes a host processor node 802 and a host processor node 804. Host processor node 802 includes a host channel adapter 806. Host processor node 804 includes a host channel adapter 808. The distributed computer system in FIG. 8 includes a SAN fabric 810, which includes a switch 812 and a switch 814. The SAN fabric includes a link coupling host channel adapter 806 to switch 812; a link coupling switch 812 to switch 814; and a link coupling host channel adapter 808 to switch 814.

In the example transactions, host processor node 802 includes a client process A. Host processor node 804 includes a client process B. Client process A interacts with host channel adapter hardware 806 through queue pair 824. Client process B interacts with hardware channel adapter hardware 808 through queue pair 828. Queue pairs 824 and 828 are data structures that include a send work queue and a receive work queue.

Process A initiates a message request by posting work queue elements to the send queue of queue pair 824. Such a work queue element is illustrated in FIG. 4. The message request of client process A is referenced by a gather list contained in the send work queue element. Each data segment in the gather list points to a virtually contiguous local memory region, which contains a part of the message, such as indicated by data segments 1, 2, and 3, which respectively hold message parts 1, 2, and 3, in FIG. 4.

Hardware in host channel adapter 806 reads the work queue element and segments the message stored in virtual contiguous buffers into data packets, such as the data packet illustrated in FIG. 7. Data packets are routed through the SAN fabric, and for reliable transfer services, are acknowledged by the final destination endnode. If not successively acknowledged, the data packet is retransmitted by the source endnode. Data packets are generated by source endnodes and consumed by destination endnodes.

Figure 9:
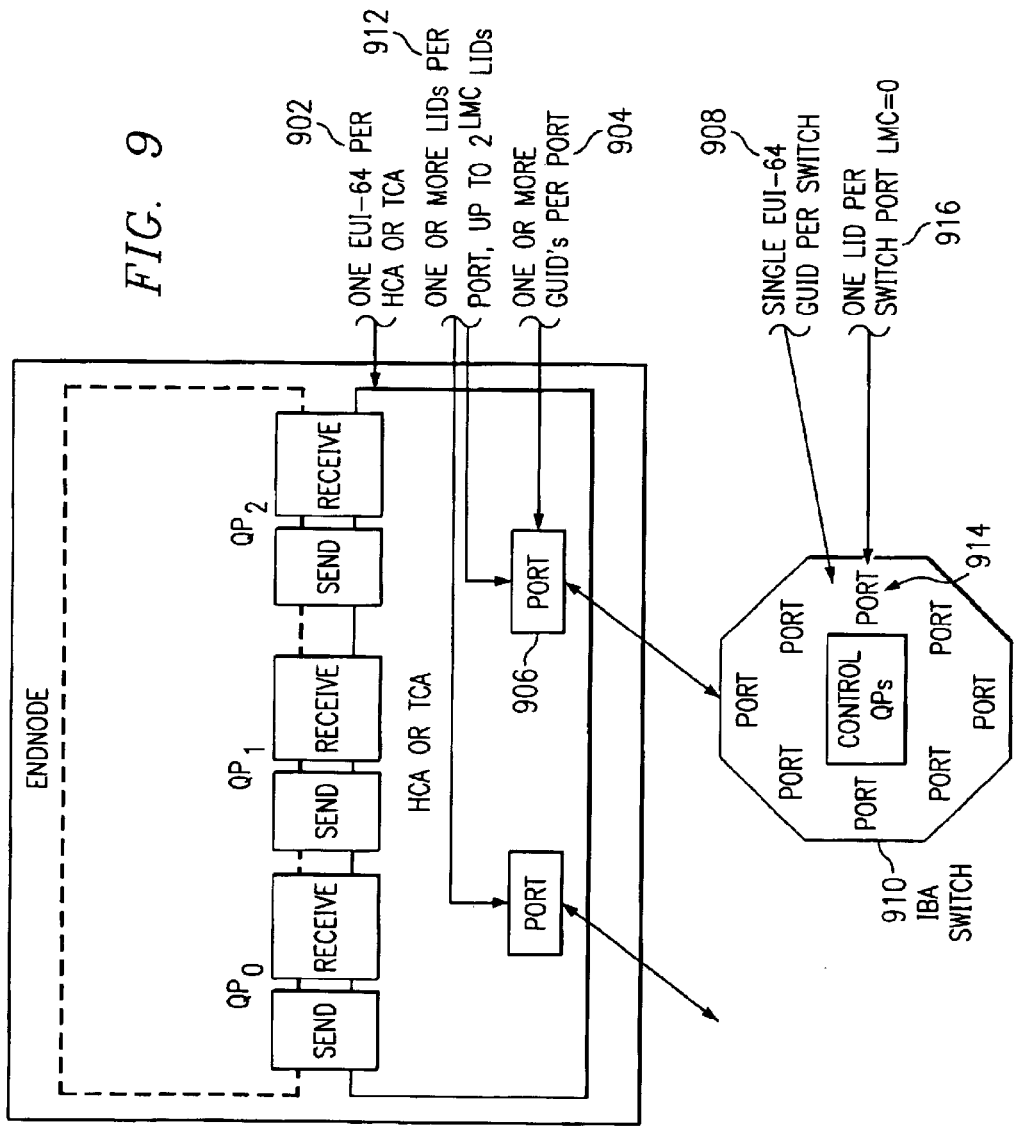
FIG. 9 is a diagram illustrating the network addressing used in a distributed networking system in accordance with the present invention.

In reference to FIG. 9, a diagram illustrating the network addressing used in a distributed networking system is depicted in accordance with the present invention. A host name provides a logical identification for a host node, such as a host processor node or I/O adapter node. The host name identifies the endpoint for messages such that messages are destined for processes residing on an end node specified by the host name. Thus, there is one host name per node, but a node can have multiple CAs.

A single IEEE assigned 64-bit identifier (EUI-64) 902 is assigned to each component. A component can be a switch, router, or CA.

One or more globally unique ID (GUID) identifier 904 are assigned per CA port 906. Multiple GUIDs (a.k.a. IP addresses) can be used for several reasons, some of which are illustrated by the following examples. In one embodiment, different IP addresses identify different partitions or services on an end node. In a different embodiment, different IP addresses are used to specify different Quality of Service (QoS) attributes. In yet another embodiment, different IP addresses identify different paths through intra-subnet routes.

One GUID 908 is assigned to a switch 910.

A local ID (LID) refers to a short address ID used to identify a CA port within a single subnet. In one example embodiment, a subnet has up to $2^{16}$ end nodes, switches, and routers, and the LID is accordingly 16 bits. A source LID (SLID) and a destination LID (DLID) are the source and destination LIDs used in a local network header. A single CA port 1006 has up to $2^{LMC}$ LIDs 912 assigned to it. The LMC represents the LID Mask Control field in the CA. A mask is a pattern of bits used to accept or reject bit patterns in another set of data.

Multiple LIDs can be used for several reasons some of which are provided by the following examples. In one embodiment, different LIDs identify different partitions or services in an end node. In another embodiment, different LIDs are used to specify different QoS attributes. In yet a further embodiment, different LIDs specify different paths through the subnet.

A single switch port 914 has one LID 916 associated with it.

A one-to-one correspondence does not necessarily exist between LIDs and GUIDs, because a CA can have more or less LIDs than GUIDs for each port. For CAs with redundant ports and redundant conductivity to multiple SAN fabrics, the CAs can, but are not required to, use the same LID and GUID on each of its ports.

Figure 10:
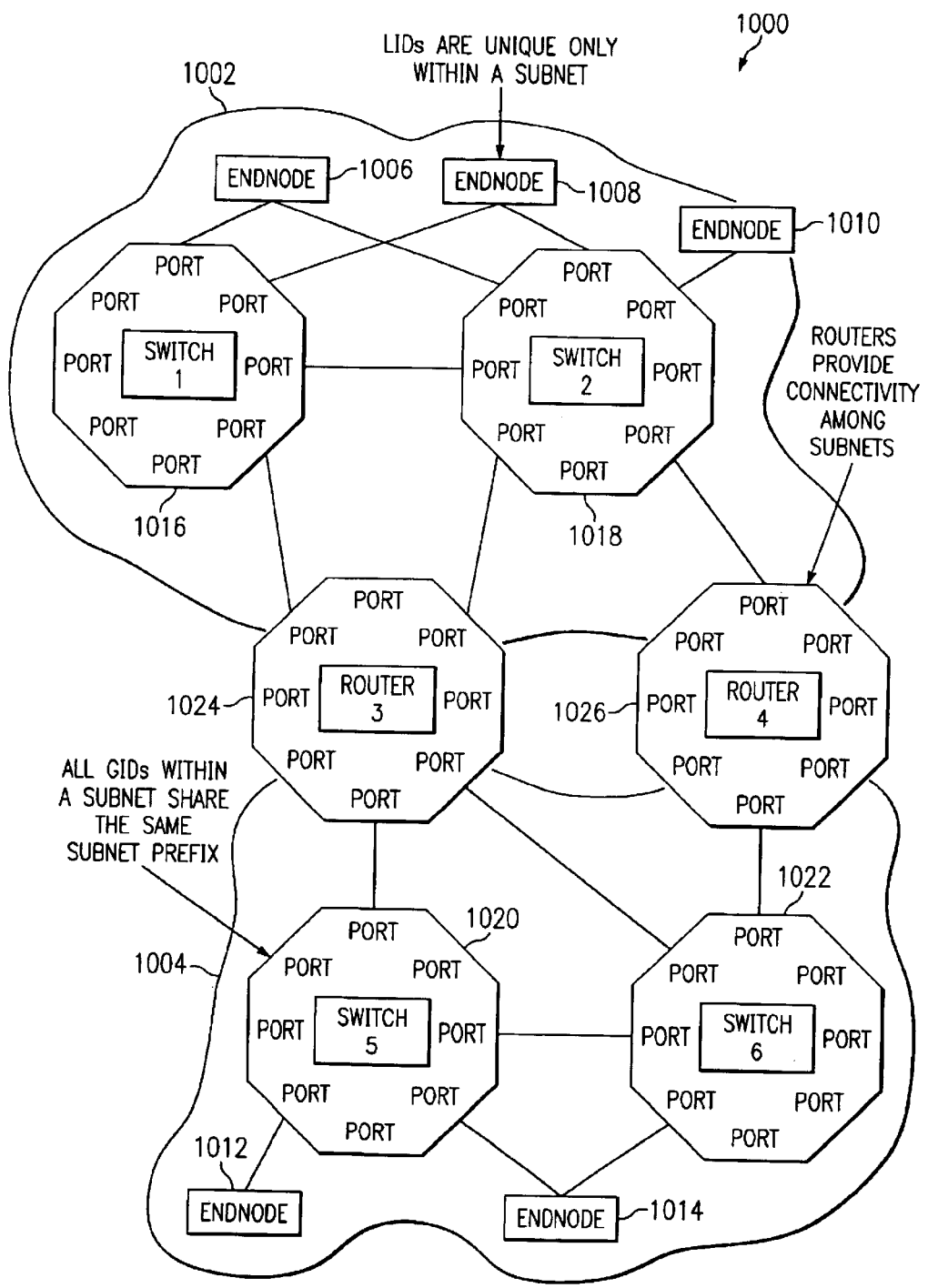
FIG. 10 is a diagram illustrating a portion of a distributed computing system in accordance with a preferred embodiment of the present invention in which the structure of SAN fabric subnets is illustrated.

A portion of a distributed computer system in accordance with a preferred embodiment of the present invention is illustrated in FIG. 10. Distributed computer system 1000 includes a subnet 1002 and a subnet 1004. Subnet 1002 includes host processor nodes 1006, 1008, and 1010. Subnet 1004 includes host processor nodes 1012 and 1014. Subnet 1002 includes switches 1016 and 1018. Subnet 1004 includes switches 1020 and 1022.

Routers connect subnets. For example, subnet 1002 is connected to subnet 1004 with routers 1024 and 1026. In one example embodiment, a subnet has up to 216 endnodes, switches, and routers.

A subnet is defined as a group of endnodes and cascaded switches that is managed as a single unit. Typically, a subnet occupies a single geographic or functional area. For example, a single computer system in one room could be defined as a subnet. In one embodiment, the switches in a subnet can perform very fast wormhole or cut-through routing for messages.

A switch within a subnet examines the DLID that is unique within the subnet to permit the switch to quickly and efficiently route incoming message packets. In one embodiment, the switch is a relatively simple circuit, and is typically implemented as a single integrated circuit. A subnet can have hundreds to thousands of endnodes formed by cascaded switches.

As illustrated in FIG. 10, for expansion to much larger systems, subnets are connected with routers, such as routers 1024 and 1026. The router interprets the IP destination ID (e.g., IPv6 destination ID) and routes the IP-like packet.

An example embodiment of a switch is illustrated generally in FIG. 3B. Each I/O path on a switch or router has a port. Generally, a switch can route packets from one port to any other port on the same switch.

Within a subnet, such as subnet 1002 or subnet 1004, a path from a source port to a destination port is determined by the LID of the destination host channel adapter port. Between subnets, a path is determined by the IP address (e.g., IPv6 address) of the destination host channel adapter port and by the LID address of the router port which will be used to reach the destination's subnet.

In one embodiment, the paths used by the request packet and the request packet's corresponding positive acknowledgment (ACK) or negative acknowledgment (NAK) frame are not required to be symmetric. In one embodiment employing certain routing, switches select an output port based on the DLID. In one embodiment, a switch uses one set of routing decision criteria for all its input ports. In one example embodiment, the routing decision criteria are contained in one routing table. In an alternative embodiment, a switch employs a separate set of criteria for each input port.

A data transaction in the distributed computer system of the present invention is typically composed of several hardware and software steps. A client process data transport service can be a user-mode or a kernel-mode process. The client process accesses host channel adapter hardware through one or more queue pairs, such as the queue pairs illustrated in FIGS. 3A, 5, and 6. The client process calls an operating-system specific programming interface, which is herein referred to as "verbs." The software code implementing verbs posts a work queue element to the given queue pair work queue.

There are many possible methods of posting a work queue element and there are many possible work queue element formats, which allow for various cost/performance design points, but which do not affect interoperability. A user process, however, must communicate to verbs in a well-defined manner, and the format and protocols of data transmitted across the SAN fabric must be sufficiently specified to allow devices to interoperate in a heterogeneous vendor environment.

In one embodiment, channel adapter hardware detects work queue element postings and accesses the work queue element. In this embodiment, the channel adapter hardware translates and validates the work queue element's virtual addresses and accesses the data.

An outgoing message is split into one or more data packets. In one embodiment, the channel adapter hardware adds a transport header and a network header to each packet. The transport header includes sequence numbers and other transport information. The network header includes routing information, such as the destination IP address and other network routing information. The link header contains the Destination Local Identifier (DLID) or other local routing information. The appropriate link header is always added to the packet. The appropriate global network header is added to a given packet if the destination endnode resides on a remote subnet.

If a reliable transport service is employed, when a request data packet reaches its destination endnode, acknowledgment data packets are used by the destination endnode to let the request data packet sender know the request data packet was validated and accepted at the destination. Acknowledgment data packets acknowledge one or more valid and accepted request data packets. The requester can have multiple outstanding request data packets before it receives any acknowledgments. In one embodiment, the number of multiple outstanding messages, i.e. Request data packets, is determined when a queue pair is created.

Figure 11:
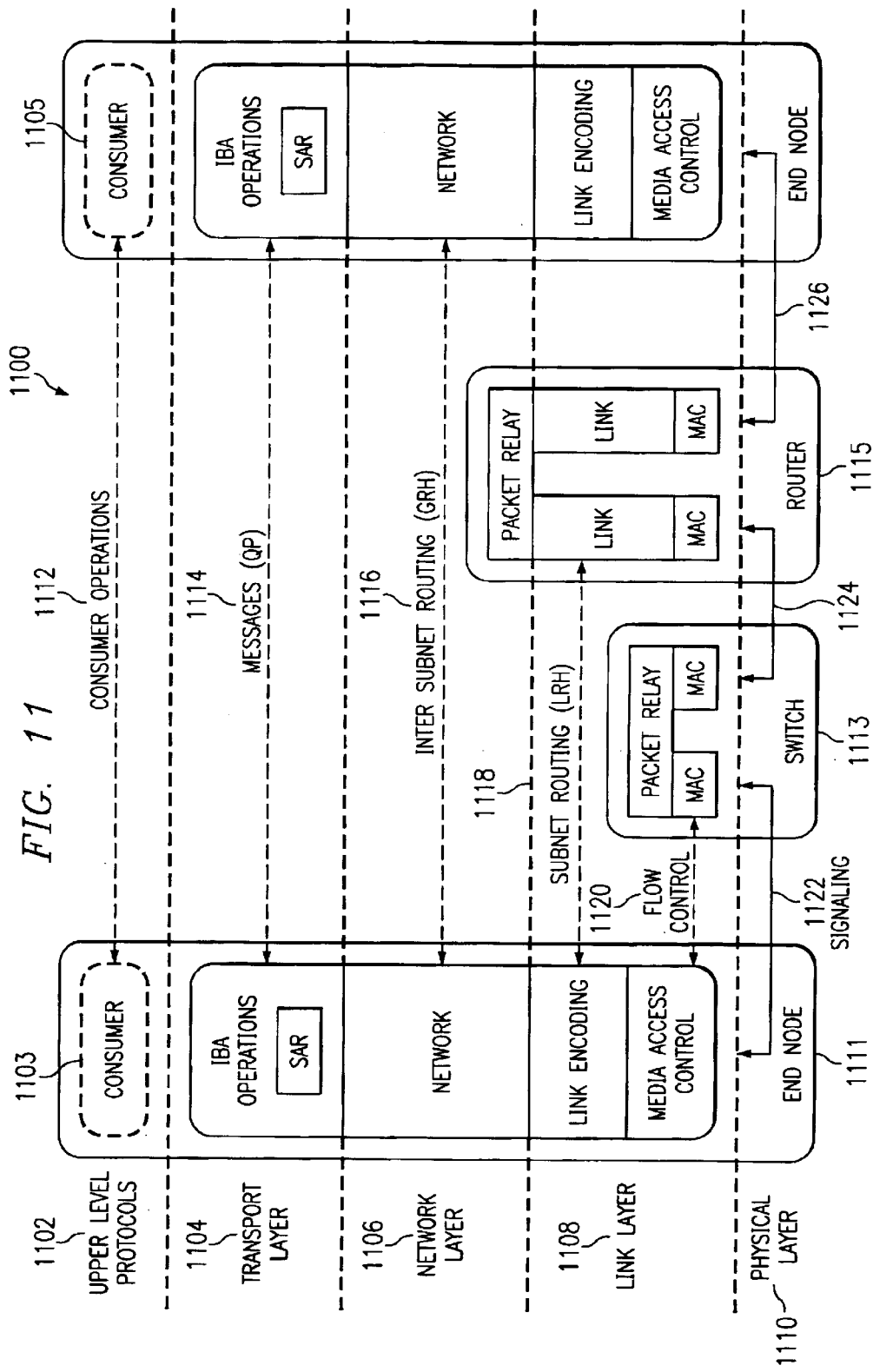
FIG. 11 is a diagram of a layered communication architecture used in a preferred embodiment of the present invention.

One embodiment of a layered architecture 1100 for implementing the present invention is generally illustrated in diagram form in FIG. 11. The layered architecture diagram of FIG. 11 shows the various layers of data communication paths, and organization of data and control information passed between layers.

Host channel adapter endnode protocol layers (employed by endnode 1111, for instance) include an upper level protocol 1102 defined by consumer 1103, a transport layer 1104; a network layer 1106, a link layer 1108, and a physical layer 1110. Switch layers (employed by switch 1113, for instance) include link layer 1108 and physical layer 1110. Router layers (employed by router 1115, for instance) include network layer 1106, link layer 1108, and physical layer 1110.

Layered architecture 1100 generally follows an outline of a classical communication stack. With respect to the protocol layers of end node 1111, for example, upper layer protocol 1102 employs verbs (1112) to create messages at transport layer 1104. Transport layer 1104 passes messages (1114) to network layer 1106. Network layer 1106 routes packets between network subnets (1116). Link layer 1108 routes packets within a network subnet (1118). Physical layer 1110 sends bits or groups of bits to the physical layers of other devices. Each of the layers is unaware of how the upper or lower layers perform their functionality.

Consumers 1103 and 1105 represent applications or processes that employ the other layers for communicating between endnodes. Transport layer 1104 provides end-to-end message movement. In one embodiment, the transport layer provides four types of transport services as described above which are reliable connection service; reliable datagram service; unreliable datagram service; and raw datagram service. Network layer 1106 performs packet routing through a subnet or multiple subnets to destination endnodes. Link layer 1108 performs flow-controlled, error checked, and prioritized packet delivery across links.

Physical layer 1110 performs technology-dependent bit transmission. Bits or groups of bits are passed between physical layers via links 1122, 1124, and 1126. Links can be implemented with printed circuit copper traces, copper cable, optical cable, or with other suitable links.

As mentioned above, the present invention provides an apparatus and method for increasing the speed at which uncontested locks are acquired by application programs and processes. An application program or process issues a lock request when the program or process wishes to obtain access to a system resource, such as a memory location, storage device location, processor, or the like. In order to obtain access to the system resource, the program or process must be granted a lock that provides exclusive access to that resource.

Locks may be contested or uncontested. A lock is contested if another program or process has been granted the lock when the current program or process issues a lock request. For contested locks, there needs to be a mechanism for ensuring that a new requester of the lock eventually gets access to the lock in a fair manner. Ensuring that this happens may involve significant processing including, for example, putting the requester's request in a queue and informing the requester that it's request has been put in the queue and so should wait for some unspecified period of time. Then, when the requester reaches the head of the queue, the processing may include informing the request that it now has been granted the lock, which may be complicated by the fact that the requesting program or process may no longer be in an active state.

For uncontested locks, however, the situation is less complicated. Because the lock is not contested, the requester is always granted the lock upon issuing the lock request. As mentioned above, most lock requests are of the uncontested type. Thus, by optimizing the granting of uncontested lock requests, the majority of lock requests will be optimized and the operation of the overall system will be made more efficient.

The present invention speeds up the process of obtaining locks held across separate computer systems by optimizing the most common case—the uncontested lock request. The present invention speeds up the process of obtaining locks by splitting the lock granting operation into two elements. First, a test is performed to determine if the lock is contested. If the lock is not contested, the lock is acquired. This test is performed using remote atomic operations provided by the SAN, and therefore is much more efficient for both the requester and the target than the use of standard messages. If the lock is contested, the second part of the lock granting operation is implemented. The second part of the lock granting operation is the invocation of a fairness mechanism which ensures that programs and processes that are contending for the lock, acquire the lock in a fair manner. Such fairness mechanisms may include the queuing described above.

The speed with which contention is detected between separate computers by using the cross-system atomic operations provides a benefit not previously obtained in a System Area Network. With current communications facilities, when computers in a network are crossed to gain access to system resources, a significant software communications stack consisting of thousands to tens of thousands of instructions, must be executed to perform receipt of any message no matter how short. The execution of these instructions interrupts normal processing resulting in loss of cache contents, memory mapping information, and the like.

The resulting overhead means that fast contention detection between systems is essentially impossible. Instead the prior solution was to send "heavy-weight" lock requests that do not perform fast contention detection. The use of cross-system atomic operations, as with the present invention, avoids all of this overhead and allows fast contention detection.

Using the present invention, because the test for lock contention is so fast, programs and processes are allowed to simply "busy wait." In other words, the programs and processes wait for the lock without giving up control of the processor on which they are running to see if the lock is uncontended. Were normal message-receiving means used on the target node, the time spent there would be so long that the requester could not simply wait like this; it would be a better use of the resources of the requesting system to switch to another task. This harms system efficiency both because of the overhead of the task-switching operation and because the execution context of the requesting process would be lost; for example, the contents of the cache on the processor where it is executing would be lost, replaced by that of another processor, and would have to be replaced.

Figure 12:
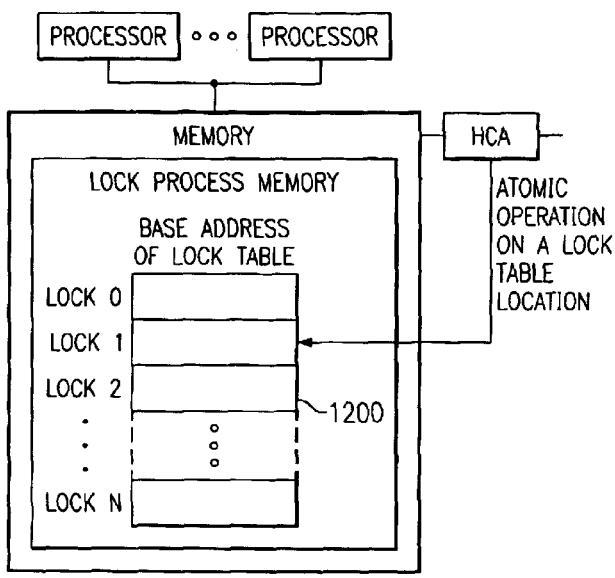
FIG. 12 is an exemplary diagram of a lock table in accordance with the present invention.

With the present invention, as shown in FIG. 12, a lock table 1200 is provided that contains a lock entry for each available lock in the system. The lock entries are illustrated in FIG. 12 as being indexed with numbers from 0 to the total number of locks N. The lock table 1200 may reside in dedicated memory of a lock process that is pinned in memory, i.e. never swapped out. The lowest memory location used by the lock table is the base of the table as illustrated.

FIG. 12 shows the entire lock table 1200 being contained in a single host node. The present invention is not limited to such an embodiment. Rather, the lock table 1200 may be distributed across a plurality of host nodes without departing from the spirit and scope of the present invention. In an embodiment in which the lock table 1200 is distributed across a plurality of host nodes, a hash on the lock name, or similar algorithm, may be used to determine which host node holds which portions of the lock table 1200.

Using a lock table such as that shown in FIG. 12, the process of requesting and obtaining a lock may be of two types. The first type of process is one in which atomic operations are available in the node containing the lock table. The second type of process is one in which atomic operations are not available in the node containing the lock table.

Figure 13A:
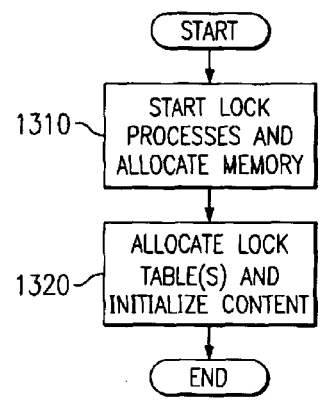
FIG. 13 is a flowchart that outlines an exemplary operation for initializing a locking subsystem and processes that make use of the locking subsystem.
Figure 13B:
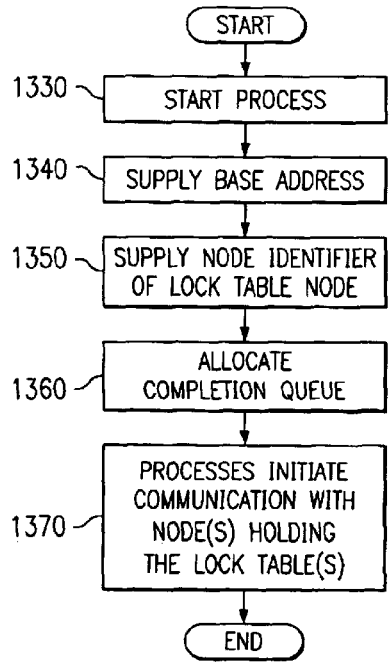
Figure 14:
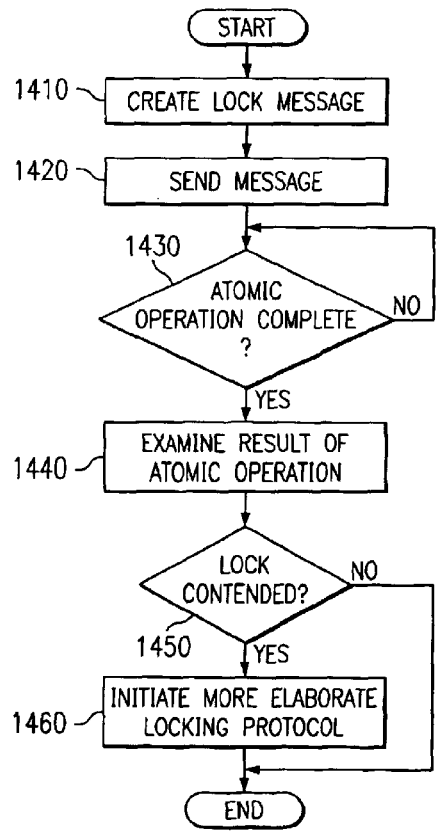
FIG. 14 is a flowchart outlining an exemplary operation for requesting a lock in accordance with the present invention.

When atomic operations are available on the node(s) containing the lock table, the requesting program, process, or the like, performs the operations illustrated in FIGS. 13A–B and 14. FIG. 13A is a flowchart that outlines an exemplary operation for initializing a locking subsystem. FIG. 13B is a flowchart outlining an exemplary operation for initializing processes that make use of the locking subsystem. The steps shown in FIG. 13B may be performed for each process that is initialized.

As shown in FIG. 13A, as part of initialization of the locking subsystem, the lock processes are started and their memory is allocated (step 1310). The lock tables are allocated within memory and their content is set to an initial value, such as 0 or the like (step 1320). The initialization of the locking subsystem then ends.

As shown in FIG. 13B, as processes that will request information are started (step 1330), they are supplied with the base address of the lock table as part of their initialization (step 1340). They are also supplied with the identifier of the node, or nodes, on which the lock table resides (step 1350).

The processes initiate communication with the lock process using the SAN connection manager to initialize queue pairs on both the requester and the resource nodes so that the queue pairs on each side of the connection can communicate with each other. If the reliable datagram service described above is used, end-to-end contexts as described above may also need to be initialized if that has not already been done as part of the initialization of another requester process. The Completion Queue associated with the Queue Pair used is also allocated and associated with the Send Queue used (step 1360). The Processes then initiate communication with the node(s) that hold the lock table(s) (step 1370). For optimal speed, a dedicated Queue Pair and Completion Queue may be used. The present description will assume a dedicated Queue Pair and Completion Queue, however the invention is not limited to such an embodiment.

Once the locking subsystem is initialized using the methodology in FIG. 13A, and a process is initialized that will request a lock as described in FIG. 13B, the present invention performs the steps shown in FIG. 14 to request a lock.

As shown in FIG. 14, the operations starts with the requesting process creating a lock message (step 1410). Creating the lock message includes a number of different operations including computing the address on which to perform the atomic operation by adding the lock table base address to the index of the lock that is the subject of the lock message. The creation of the lock message further includes setting the parameter compared or added to the target memory location (depending on whether the atomic operation is a fetch-and-add or a compare-and-swap operation). For the fetch-and-add atomic operation, the parameter will typically be, but is not required to be, 1. For the compare-and-swap atomic operation, the parameter will typically be, but is not required to be, 0.

Other message parameters are also set up, such as the destination identification, the target Queue Pair, the authentication (e.g., R_Key), and the like. If multiple lock tables on different nodes are used, the destination identification will have to be computed from a lock "name" provided using any appropriate scheme, such as a hash value or the like.

Optimally, all message parameters except the lock number (and destination and target Queue Pair, if multiple lock tables are used on multiple nodes) can be preset as part of initialization, and reused for each lock message. This avoids having to set them up each time a message is requested. In addition, the atomic operation parameter may be set appropriately along with other message parameters, such as destination identification and target Queue Pair number, during initialization.

Once the lock message is created, the requester sends it to the target receive queue (step 1420). This may involve using a verb to post the message to the Send Queue initialized for this purpose earlier. The requester then waits for completion of the operation (step 1430). The requester, while waiting for completion, may continually check to see if the lock request is complete. This may include using a verb that tests for an entry in the completion queue associated with the lock request.

After the lock request operation is complete, the result returned by the atomic operation is examined (step 1440). Based on the examination of the result, it is determined whether the lock is uncontended (step 1450). If the lock is uncontended, e.g., the value in the lock table memory location was zero prior to the atomic operation, then it was the case that the location was set, by the atomic operation, to a value indicating that this process "owns" the lock. This was performed as part of the atomic operation while the requester was waiting for that operation's conclusion (step 1430). Thus, any other process attempting to acquire the lock will not be able to obtain the lock until the lock is released. Any other process attempting to acquire the lock will see a value in the lock table that indicates contention, e.g., a non-zero value.

If the lock is contended, e.g., indicated by a returned value that is not zero, then a more elaborate locking protocol is used (step 1460). The requester invokes such a protocol, typically giving it an identifier of the lock requested and the result of the atomic operation. Such protocol may include a fairness mechanism for eventually providing the process with the requested lock in accordance with the mechanisms of the protocol. When that protocol grants the lock to the requester, it returns to this point in the processing, possibly after stopping and then restarting the requester process.

The more elaborate protocol may perform an uninterruptible operation on the lock table that leaves it containing a value indicating that contention has occurred. This is unnecessary if the locking operation used is fetch-and-add or a similar operation that accumulates requests in the lock locations since the atomic operation itself will have performed that function.

Thereafter, the requester continues with its processing using the resource requested by the request for the lock. When the requester has finished with the resource that was reserved for its use by obtaining the lock, the requester similarly formats a message targeting the same element of the lock table used before. This message includes an atomic operation that will undo the prior result, such as performing a fetch-and-add operation using −1 (negative 1) as the argument to undo the lock operation that added 1 (one). The result may indicate that no other requester has requested this lock in the interim. The exact way in which this is done depends on the particular atomic operation used for locking. For example, if Fetch-and-Add is used with an increment of 1, a result other than 1 (one) returned as the content of the lock location prior to subtracting one to reset the lock indicates that another Fetch-and-Add operation has happened in the interim. If no contention is indicated, the requester need not do any more. However, if the lock table indicates contention, the requester informs the more elaborate locking protocol that is has released the lock so that the more elaborate locking protocol may grant the lock to the next requester in accordance with that protocol.

The above functionality shown in FIG. 14 is provided when the node on which the lock table is provided is capable of atomic operations. If the node is not capable of atomic operations, then the process on the node holding the lock table can be used to simulate them using atomic operations on memory that are native to the host system.

With a node that is not capable of atomic operations, the requester operation is similar to the prior operation shown in FIG. 14, with two exceptions. First, instead of construction an atomic operation in step 1410, the operation constructs a normal SEND operation, indicating in the data the same information carried by the atomic operation. This is directed to a Queue Pair on the lock node that is monitored by the locking process.

Second, the requester arranges for a receiving response message from the locking process prior to sending the request, e.g., by posting a receive buffer, i.e. an area in memory where received data is placed (as discussed previously) to a Receive Queue dedicated to that purpose. After receiving an acknowledgment that the request was sent, the requester busy-waits for the response message from the locking process, e.g., by continually checking the completion queue of the Receive Queue for an entry. The content of the response message from the lock process can be identical to that of the atomic operation, or it can be a more direct indication of queue contention, such as a cross-system identifier of an event to be waited on by the local lock queuing mechanism.

Releasing a lock is, likewise, similar to that previously described, with analogous changes. First a receive buffer is allocated, a normal message is sent, and after completion of the send, a message from the process is awaited. In an alternative implementation, the lock process can itself inform the more elaborate lock procedure when contention occurs on both lock request and lock release. For example, in addition to the reply message to the requester, sending a message to the node where the process holding the lock resides giving the locking system on that node an indicator of the process that is waiting for the lock (such as the QP number used for the send).

For greatest efficiency, the process simulating the atomic operations can be given very high priority and one of the host processes on the lock table node can be dedicated to the simulation. The increase in locking efficiency can easily offset the loss in power from doing this in applications where locking is critical, such as databases where the data is not highly partitioned between nodes.

Thus, the present invention provides a mechanism by which the process for acquiring uncontested locks in a SAN may be optimized. In this way, the most often encountered locking situation is made more efficient and thus, the efficiency of the overall system with regard to locking processes is increased.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for acquiring a lock on a system resource in a computer system, the method comprising:

assigning a first memory location to a first system resource, such that a number stored at said first memory location indicates whether said first system resource is locked;

performing an atomic operation that (a) determines if said first memory location contains a first value, indicating that said system resource is not locked and (b) if said first memory location contains said first value, stores a second value, indicating that said first system resource is locked, wherein said atomic operation is non-interruptible; and if said first memory location does not contain said first value, transferring control to a different operation that will contend for the lock for said first system resource.

2. The method of claim 1, wherein said first memory location is memory that is never swapped out.

3. The method of claim 1, wherein a program or process that initiates said atomic operation can wait for a response from said atomic operation without giving up control of a processor on which it is running.

4. The method of claim 1, wherein said performing step comprises creating a lock message that contains the address of said first memory location and a first number, wherein said first number is added to a second number stored in said first memory location to create a third number and said second number is returned in a response.

5. The method of claim 1, wherein said performing step comprises creating a lock message that contains the address of said first memory location, a first number, and a second number, wherein said first number is compared to a third number stored in said first memory location and if said first number is equal to said third number, said second number is stored in said first memory location.

6. The method of claim 1, wherein the non-interruptibility of said atomic operation can be modified such that no other operation performed by a channel adapter can intervene, but other host operations can intervene.

7. The method of claim 1, wherein the non-interruptibility of said atomic operation can be modified such that no other operation performed by a first channel adapter performing said atomic operation can intervene, but operations from other channel adapters or other host operations can intervene.

8. The method of claim 1, wherein said first memory location is part of a lock table having a respective memory location for each system resource that can be locked.

9. The method of claim 8, wherein said lock table resides on a single node in a network.

10. The method of claim 8, wherein said lock table is distributed across a plurality of nodes in a network.

11. The method of claim 8, wherein each system resource that can be locked has a respective lock name and a hash on said respective lock name of said first system resource identifies a first node of said plurality of nodes that holds said first memory location.

12. A computer program product for acquiring a lock on a system resource in a computer system, comprising:
   a computer readable medium having computer readable program code embodied therein;
   computer readable program code configured to assign a first memory location to a first system resource, such that a number stored at said first memory location indicates whether said first system resource is locked;
   computer readable program code configured to perform an atomic operation that (a) determines if said first memory location contains a first value, indicating that said system resource is not locked and (b) if said first memory location contains said first value, stores a second value, indicating that said first system resource is locked, wherein said atomic operation is non-interruptible; and
   computer readable program code configured to transfer control to a different operation that will contend for the lock for said first system resource if said first memory location does not contain said first value.

13. The computer program product of claim 12, wherein said first memory location is memory that is never swapped out.

14. The computer program product of claim 12, wherein a program or process that initiates said atomic operation can wait for a response from said atomic operation without giving up control of a processor on which it is running.

15. The computer program product of claim 12, wherein said atomic operation comprises computer readable program code configured to create a lock message that contains the address of said first memory location and a first number, wherein said first number is added to a second number stored in said first memory location to create a third number and said second number is returned in a response.

16. The computer program product of claim 12, wherein said atomic operation comprises computer readable program code configured to create a lock message that contains the address of said first memory location, a first number, and a second number, wherein said first number is compared to a third number stored in said first memory location and if said first number is equal to said third number, said second number is stored in said first memory location.

17. The computer program product of claim 12, further comprising computer readable program code configured to modify the non-interruptibility of said atomic operation such that no other operation performed by a channel adapter can intervene, but other host operations can intervene.

18. The computer program product of claim 12, further comprising computer readable program code configured to modify the non-interruptibility of said atomic operation such that no operation performed by any channel adapter can intervene, but other host operations can intervene.

19. The computer program product of claim 12, wherein said computer readable program code is further configured to use a lock table having a respective memory location for each system resource that can be locked.

20. The computer program product of claim 19, wherein said lock table resides on a single node in a network.

21. The computer program product of claim 19, wherein said lock table is distributed across a plurality of nodes in a network.

22. The computer program product of claim 19, wherein each system resource that can be locked has a respective lock name and a hash on said respective lock name of said first system resource identifies a first node of said plurality o nodes that holds said first memory.

23. A computer system, comprising:
   a plurality of processors connected such that said plurality of processors share a plurality of system resources;
   instructions for assigning a first memory location to a first system resource, such that a number stored at said first memory location indicates whether said first system resource is locked;
   instructions for performing an atomic operation that (a) determines if said first memory location contains a first value, indicating that said system resource is not locked and (b) if said first memory location contains said first value, stores a second value, indicating that said first system resource is locked, wherein said atomic operation is non-interruptible; and
   instructions for transferring control to a different operation that will contend for the lock for said first system resource if said first memory location does not contain said first value.

24. The computer system of claim 23, wherein said first memory location is memory that is never swapped out.

25. The computer system of claim 23, wherein a program or process that initiates said atomic operation can wait for a response from said atomic operation without giving up control of a processor on which it is running.

26. The computer system of claim 23, wherein said instructions for performing an atomic operation comprise instructions for creating a lock message that contains the address of said first memory location and a first number, wherein said first number is added to a second number stored in said first memory location to create a third number and said second number is returned in a response.

27. The computer system of claim 23, wherein said instructions for performing an atomic instructions for creating a lock message that contains the address of said first memory location, a first number, and a second number, wherein said first number is compared to a third number stored in said first memory location and if said first number is equal to said third number, said second number is stored in said first memory location.

28. The computer system of claim 23, further comprising instructions for modifying the non-interruptibility of said atomic operation such that no other operation performed by a channel adapter can intervene, but other host operations can intervene.

29. The computer system of claim 23, further comprising instructions for modifying the non-interruptibility of said atomic operation such that no other operation performed by a channel adapter can intervene, but other host operations can intervene.

30. The computer system of claim 23, wherein said first memory location is part of a lock table having a respective memory location for each system resource that can be locked.

31. The computer system of claim 30, wherein the lock table resides on a single node in a network.

32. The computer system of claim 30, wherein the lock table is distributed across a plurality of nodes in a network.

33. The computer system of claim 30, wherein each system resource that can be locked has a respective lock name and a hash on said respective lock name of said first system resource identifies a first node of said plurality of nodes that holds said first memory location.

* * * * *

UNITED STATES PATENT AND TRADEMARK OFFICE
CERTIFICATE OF CORRECTION

PATENT NO. : 6,950,945 B2
APPLICATION NO. : 09/886187
DATED : September 27, 2005
INVENTOR(S) : Pfister et al.

It is certified that error appears in the above-identified patent and that said Letters Patent is hereby corrected as shown below:

(57) Abstract, line 16: after "operation" delete "than" and insert --that--.

Col. 22, line 59: after "atomic" insert --operation comprise--.

Signed and Sealed this

Fourteenth Day of November, 2006

JON W. DUDAS
*Director of the United States Patent and Trademark Office*